(12) United States Patent
Shah (10) Patent No.: US 9,361,006 B2
(45) Date of Patent: Jun. 7, 2016

(54) GENERATING MEMBER PROFILE RECOMMENDATIONS BASED ON CONNECTION TIMING DATA IN A SOCIAL GRAPH

(71) Applicant: LinkedIn Corporation, Mountain View, CA (US)

(72) Inventor: Samir M. Shah, San Francisco, CA (US)

(73) Assignee: LinkedIn Corporation, Mountain View, CA (US)

(*) Notice: Subject to any disclaimer, the term of this patent is extended or adjusted under 35 U.S.C. 154(b) by 167 days.

(21) Appl. No.: 14/144,402

(22) Filed: Dec. 30, 2013

(65) Prior Publication Data

US 2015/0106365 A1    Apr. 16, 2015

Related U.S. Application Data

(60) Provisional application No. 61/891,787, filed on Oct. 16, 2013.

(51) Int. Cl.
| | |
|---|---|
| G06F 17/30 | (2006.01) |
| G06F 3/0484 | (2013.01) |
| H04L 29/08 | (2006.01) |
| G06Q 50/00 | (2012.01) |

(52) U.S. Cl.
CPC ...... *G06F 3/04842* (2013.01); *G06F 17/30386* (2013.01); *G06Q 50/01* (2013.01); *H04L 67/306* (2013.01)

(58) Field of Classification Search
CPC ........................................................ G06F 17/30
USPC .................................................. 707/600–899
See application file for complete search history.

(56) References Cited

U.S. PATENT DOCUMENTS

| | | | |
|---|---|---|---|
| 2015/0106361 A1* | 4/2015 | Shah | .................... G06Q 10/00 707/723 |
| 2015/0106371 A1 | 4/2015 | Shah | |

* cited by examiner

*Primary Examiner* — Isaac M Woo
(74) *Attorney, Agent, or Firm* — Schwegman Lundberg & Woessner, P.A.

(57) ABSTRACT

Systems and methods for generating recommendations based on data derived from a social network are described. For example, a first indirect connection of a source member profile may be identified. The first indirect connection is a member profile connected to the source member through a first connection path. A second indirect connection of the source member profile is also identified. The second indirect connection is a member profile connected to the source member through a second connection path. A selection is made between the first indirect connection and the second indirect connection based on a comparison of timing scores calculated for the indirect connections. The selected indirect connection is then surfaced to a client device associated with the source member profile.

20 Claims, 7 Drawing Sheets

GENERATING MEMBER PROFILE RECOMMENDATIONS BASED ON CONNECTION TIMING DATA IN A SOCIAL GRAPH

RELATED APPLICATIONS

This application claims priority from U.S. Provisional Appl. No. 61/891,787, filed Oct. 16, 2013, entitled "GENERATING CONNECTION RECOMMENDATIONS BASED ON RECENT CONNECTIONS AND CONNECTIONS OF CLOSE CONNECTIONS," all of which is incorporated herein by reference in its entirety for all purpose.

TECHNICAL FIELD

The present disclosure generally relates to information retrieval and processing. More specifically, the present disclosure relates to methods, systems and computer program products for generating recommendations based on data derived from a social graph of a social network service.

BACKGROUND

Online social network services provide members with a mechanism for defining, and memorializing in a digital format, representations of themselves (e.g., member profiles) and their relationships with other people. This digital representation of relationships between members is frequently referred to as a social graph. Many social network services utilize a social graph to facilitate electronic communications and the sharing of information between its users or members. For instance, the relationship between two members of a social network service, as defined in the social graph of the social network service, may determine the access and sharing privileges that exist between the two members. As such, the social graph in use by a social network service may determine the manner in which two members of the social network service can interact with one another via the various communication and sharing mechanisms supported by the social network service.

Some social network services aim to enable friends and family to communicate and share with one another, while others are specifically directed to business users with a goal of facilitating the establishment of professional networks and the sharing of business information. For purposes of the present disclosure, the terms "social network" and "social network service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

With many social network services, members are prompted to provide a variety of personal information, which may be displayed in a member's personal web page. Such information is commonly referred to as "personal profile information", or simply "profile information", and when shown collectively, it is commonly referred to as a member's profile. For example, with some of the many social network services in use today, the personal information that is commonly requested and displayed as part of a member's profile includes a member's age (e.g., birth date), gender, contact information, home town, address, the name of the member's spouse and/or family members, a photograph of the member, interests, and so forth. With certain social network services, such as some business network services, a member's personal information may include information commonly included in a professional resume or curriculum vitae, such as information about a person's education, employment history, job skills, professional organizations, and so forth.

Some traditional social network services may behave as a searchable directory of people. In such systems, a user interface ("UI") may be provided to a member to allow that member to search for other members of the social network to connect. For example, the member may use the UI to enter key terms or other properties in which to search a population of member profiles. Based on the search result, the member may search through the member profiles matching the search criteria to identify member profiles that are of interest. Thus, traditional systems may rely on knowledge and actions from the searching member to identify member profiles that are of interest.

DESCRIPTION OF THE DRAWINGS

Some embodiments of the technology are illustrated by way of example and not limitation in the figures of the accompanying drawings.

DETAILED DESCRIPTION

Overview

The present disclosure describes, among other things, methods, systems, and computer program products, which individually provide functionality for generating recommendations based on data derived from a social graph of a social network service. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Example embodiments may include systems and methods to generate recommendations based on data derived from social graph data. One type of recommendation that may be generated by example embodiments is a connection recommendation. A connection recommendation may be a recommendation that attempts to solve a link prediction problem by using node (e.g., a member profile) and edge (e.g., member connections) features in the social graph to predict whether an invitation will occur between two nodes that are not directly connected. One type of feature of the social graph that may be used by example embodiments is connection timing data that specifies when member connections between member profiles are formed.

Accordingly, an example embodiment may relate to methods, systems, and machine readable medium for generating a recommendation based on connection timing data of a member connection in a social graph. That is, some embodiments may generate, for a source member profile, a member profile recommendation of an indirect connection (e.g., second-degree connections, third-degree connections, and so forth) of the source member profile based on timing data related to member connections in a social graph of the source member profile. To generate such member profile recommendations, a recommendation engine may, for example, identify a first indirect connection of a source member profile. The first indirect connection may be a member profile connected to the source member profile through a first connection path that includes member connections between the source member profile, a first direct connection, and the first indirect connection.

The recommendation engine may then, in some embodiments, identify a second indirect connection of the source member profile. The second indirect connection may be a member profile connected to the source member profile through a second connection path that includes member connections between the source member profile, a second direct connection, and the second indirect connection.

The recommendation engine may then select between the first indirect connection and the second indirect connection based on a comparison of a timing score calculated for the first indirect connection and a timing score calculate for the second indirect connection.

The indirect connection selected by the recommendation engine may then be used for a number of purposes, depending on embodiment. For example, in some embodiments, a presentation engine may then surface the selected indirect connection to the source member profile as a connection recommendation. The connection recommendation may be configured to cause a client device operated by the source member to display information from the member profile of the selected indirect connection (e.g., name, title, profile image, and the like). The connection recommendation may also be configured to cause the client device to display an interface element that, if activated by the source member, causes the social network service to form a direct connection between the source member and the selected indirect connection.

Example embodiments may provide many practical applications. For example, some systems and methods may leverage information associated with member connections between members of a social network service in order to provide targeted, actionable information to the members, in order to encourage and/or prompt the members to seek additional connections within the social network service, encourage outside users to join the social network service, and other benefits.

In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Other advantages and aspects of the inventive subject matter will be readily apparent from the description of the figures that follows.

Suitable System

Figure 1:
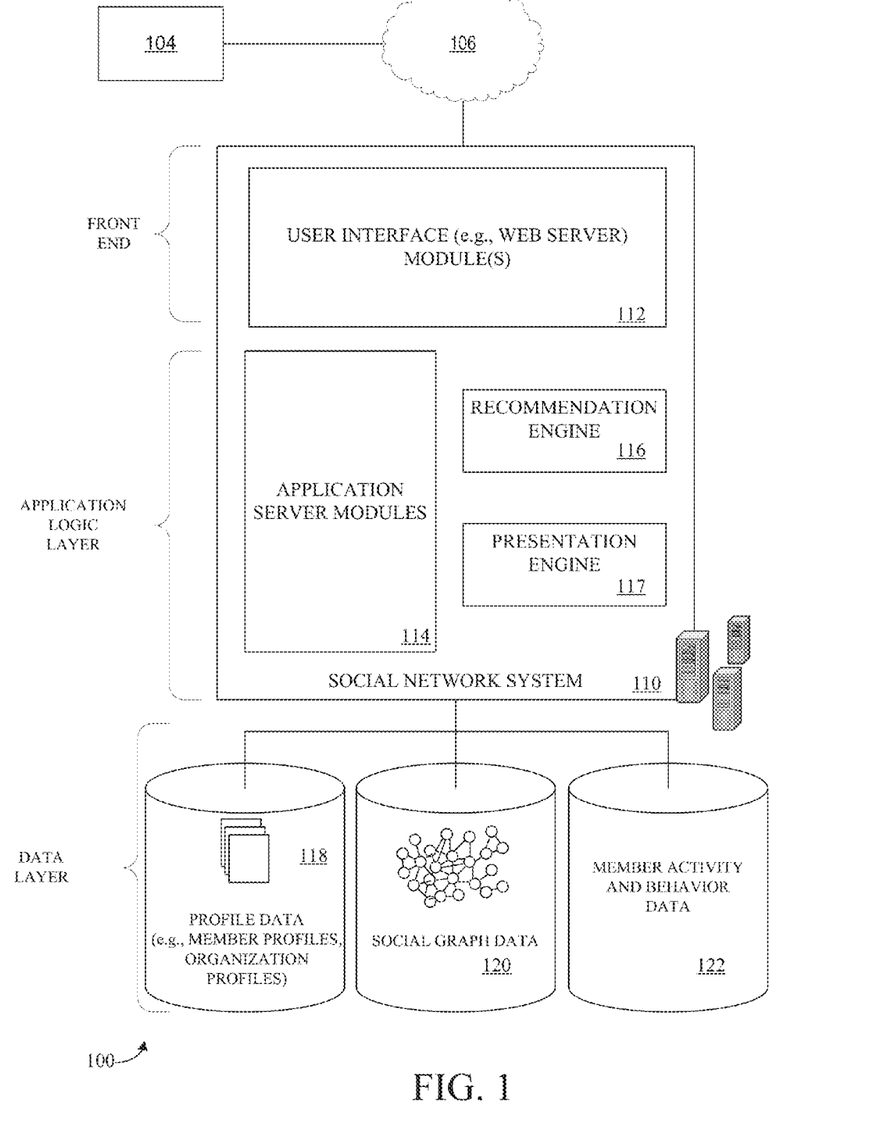
FIG. 1 is a block diagram illustrating various functional components of a suitable computing environment, consistent with some embodiments, for generating member profile recommendations.

FIG. 1 is a block diagram illustrating various components or functional modules of a social network service 100, consistent with some embodiments. The modules, systems, and/or engines shown in FIG. 1 represent a set of executable software instructions and the corresponding hardware (e.g., memory and processor) for executing the instructions. However, one skilled in the art will readily recognize that various additional functional modules and engines may be used with the social network service 100 to facilitate additional functionality that is not specifically described herein. Furthermore, the various functional modules and engines depicted in FIG. 1 may reside on a single server computer, or may be distributed across several server computers in various arrangements As shown in FIG. 1, a front end layer of the social network system 110 includes a user interface module (e.g., a web server) 112, which receives requests from various client-computing devices, such as a source member device 104, over a network 106, and communicates appropriate responses to the requesting client devices. For example, the user interface module(s) 112 may receive requests in the form of Hypertext Transport Protocol (HTTP) requests, or other web-based, application programming interface (API) requests. The source member device 104 may be any suitable computing device—such as a personal computer, laptop, cellular phone, smart phone, computing tablet, and the like—executing conventional web browser applications, or applications that have been developed for a specific platform (e.g., operating system, computer system, or some combination thereof).

The network 106 may be any communications network utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, wireless data networks (e.g., Wi-Fi® and WiMax® networks), and so on.

The application logic layer of the social network system 110 includes various application server modules 114, which, in conjunction with the user interface module(s) 112, generates various user interfaces (e.g., web pages) with data retrieved from various data sources in the data layer. With some embodiments, individual application server modules 114 are used to implement the functionality associated with various services and features of the social network service. For instance, the ability to generate connection recommendations for a source member may be service (or services) implemented in independent application server modules 114. Similarly, a variety of other applications or services that are made available to members of the social network service will be embodied in their own application server modules 114. For example, with some embodiments, the social network system 110 includes modules that may individually or in combination provide member profile recommendations, such as a recommendation engine 116 and a presentation engine 117. The recommendation engine 116 may be a computer-implemented module configured to generate member profile recommendations. Example embodiments may use a variety of information to generate the member profile recommendations, such as data derived from member connections in a social graph.

The presentation engine 117 may be a computer-implemented module configured to generate user interface elements for interacting with the member profile recommendations. For instance, the presentation engine 117 may generate data and logic that, when executed on by one or more processors, causes a client device to display a user interface that depicts the member profile recommendation. In some cases, the presentation engine 117 may use the member profile recommendation to generate user interface elements that may cause the social network service 100 to create a member connection (or initiate the process for forming a member connection) between the source member profile and the member profile represented by the member profile recommendation.

As shown in FIG. 1, the data layer includes several databases, such as a database 118 for storing profile data. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 118.

Once registered, a member may invite other members, or be invited by other members, to connect via the social network service. A "member connection," or simply "connection," may require a bi-lateral agreement by the members, such that both members acknowledge the establishment of the connection. It is to be appreciated that members may "connect" with entities other than member profiles, such as companies, groups, or any other suitable cohort. The various associations and relationships that the members establish with other members, or with other entities represented by date stored in the database 118, are stored and maintained within the social graph, shown in FIG. 1 with reference number 120.

The social network service 100 may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service 100 may host various job listings providing details of job openings with various organizations.

As members interact with the various applications, services and content made available via the social network service, the members' behavior (e.g., content (e.g., profiles) viewed, links selected, messages sent, etc.) may be monitored and information concerning the member's behavior may be stored, for example, as indicated in FIG. 1 by the database with reference number 122. One type of behavior data that may be stored in database 122 is member activity between a member having one member profile and another member having another member profile. As described above, examples of member activities include activities where one member: visits a profile page of a member, messages the member, saves the member in a contact list, introduces the member to another member profile.

Example embodiments may use workflows (e.g., Hadoop® workflows) to implement some portions of the recommendation engine 116. These workflows may execute feature extraction tasks—signals such as the recency of a member connection, company and school overlap, geographical distance, similar ages, and many others—followed by a model application step. The resulting data model of these workflows may be a key-value store where the key is a member profile identifier and the value is a list of member id, timing score pairs.

Example of Social Graph Data

Figure 2:
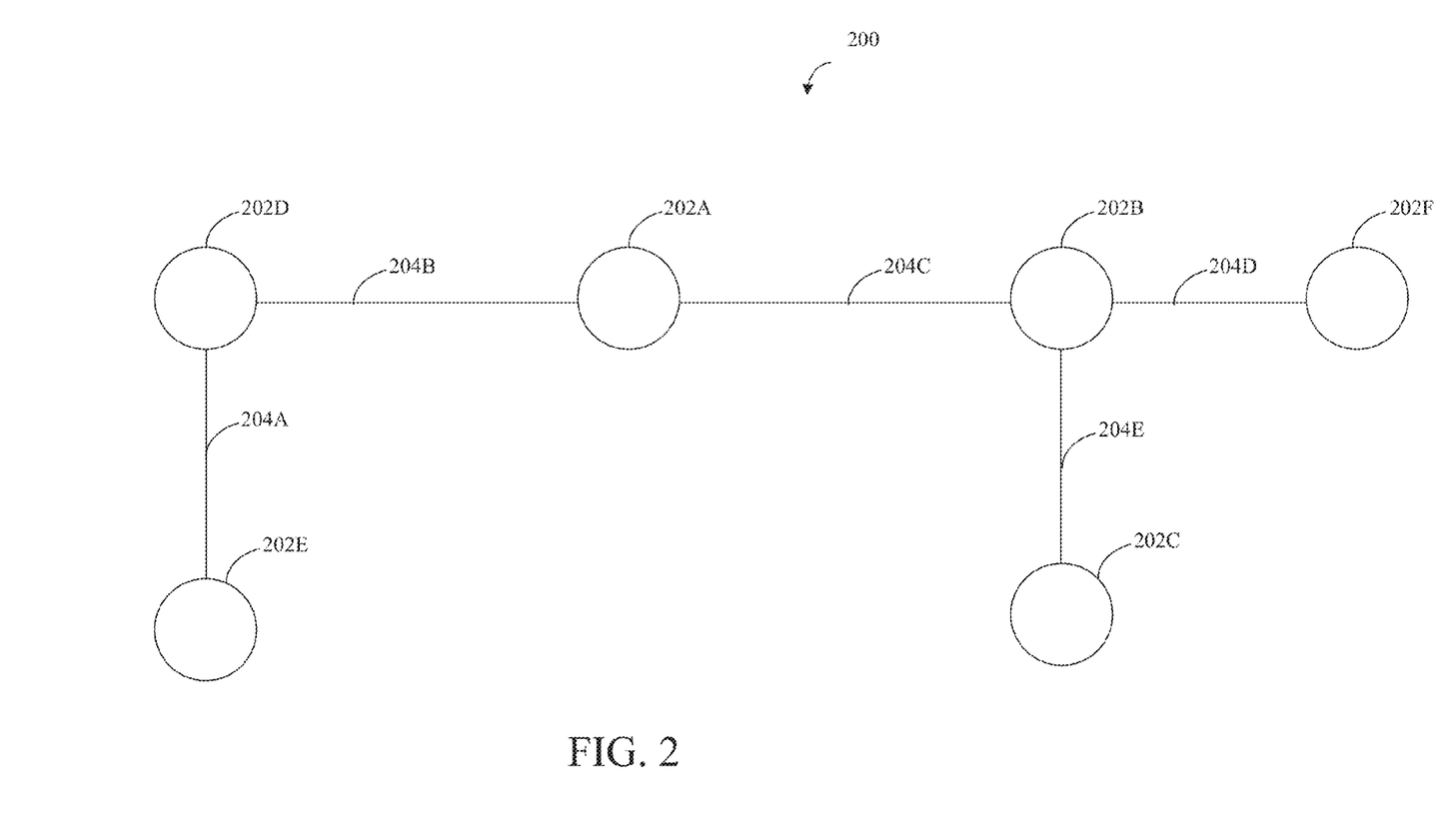
FIGS. 2-3 are diagrams illustrating example data models used by the recommendation engine to generate connection recommendations, consistent with some embodiments, consistent with some embodiments.

As discussed above, the recommendation engine 116 may be configured to process data from a social graph to generate member profile recommendations. Accordingly, a social graph is now discussed in greater detail. FIG. 2 is a data diagram illustrating an example of a social graph 200 that includes member profiles 202A-F connected to each other through member connections 204A-E, according to an example embodiment.

The member profiles 202A-F, commonly referred to as nodes of the social graph 200, may each represent a member profile of a user of the social network service. Consistent with some embodiments, the member profiles 202A-F may be created and stored in the database 118 of FIG. 1 when a person initially registers to become a member of the social network service and provides some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on.

The member connections 204A-E may be data or logic that represents a member connection between two member profiles. By way of example and not limitation, a member connection may represent: a member profile accepting a connection request or invite from another member profile; a member profile sending a member connection request or invite to another member; a member importing information from an address book or other database or online location that includes information identifying users or people that are associated with the member; a member following another member; a member viewing the member profile or another member or viewing information identifying potential connections, such as potential connections inferred and/or suggested to the member by the social network service 130; and so on. In some embodiments, a member connection can be unidirectional (e.g., formed by following or subscribing) or bidirectional (e.g., formed by "connecting" or "friending"). It is also not a limitation of this description that two member connections who are deemed "connections" for the purposes of this disclosure are not necessarily connected in real life, but that can be the case.

With respect to a particular member profile, a member connection may be a direct member connection or an indirect member connection. When a member connection of a social graph connects two member profiles, those two member profiles may be referred to as a first-degree connections and the member connection between the two members may be referred to as a first-degree member connection. To illustrate, the member profile 202A is first-degree connections with member profiles 202B and 202D because the member profile 202A is connected to member profile 202B via the member connection 204C and the member profile 202A is connected to member profile 202D via the member connection 204B.

In comparison to a direct connection, an indirect connection is where two member profiles lack a first-degree member connection but a path between the two member profiles exists in the social graph. The number of edges (e.g., member connections) in a minimum path that connects a member profile to another profile is considered the degree of the connection between the member profiles. For example, FIG. 2 shows that the member profiles 202C and 202F are second-degree connections to the member profile 202A because the minimum path from 202A to 202C includes two member connections (204C and 204E), and the minimum path from 202A to 202F also includes two member connections (204C and 204D). For the same reason, it should be appreciated that member profile 202E is also a second-degree connection. The limit on the number of degrees of separation for member connections that a member profile is allowed is typically dictated by the restrictions and policies implemented by the social networking service.

Thus, a social graph (e.g., the member profiles and connection activities thereof) may be a data structure that illustrates how a member profile (e.g., the source member profile 202A) is "connected" to other member profiles of the social network service.

Figure 3:
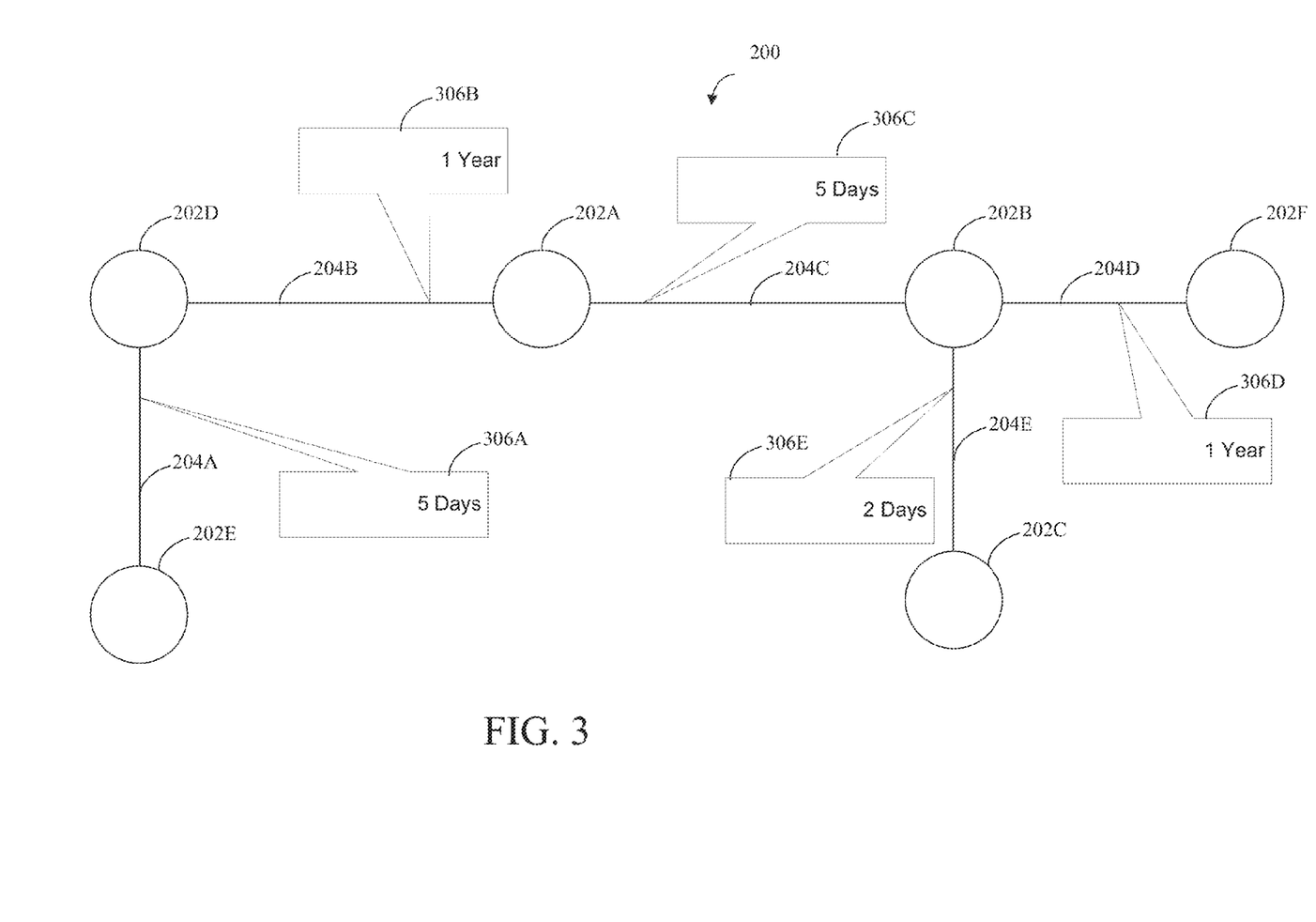

Some embodiments of the social graph 200 may include data in addition to the data representing connection between member profiles, as shown in FIG. 2. For example, FIG. 3 is a data diagram illustrating timing data that may be included in the social graph 200, according to an example embodiment. FIG. 3 shows that the social graph 200 may include connection time data 306A-E that is linked to the member connections 204A-E. "Connection time data," as used herein, may include any suitable data that represents a relative or absolute time in which an activity forming the member connection is performed. As described above, a member connection may represent an event or activity that is associated with one member connecting with and/or attempting to connect with another member, a member viewing or accessing information indicating potential connections (e.g., "people you may know" information), among other things.

With continued reference to FIG. 3, the member connections 204A-E each have connection time data (e.g., connection time data 306A-E) that indicate when the corresponding member connection was formed or otherwise detected within the social network service. For example, the member profile 202A and the member profile 202B formed the member connection 204C "5 Days" ago and the member profile 202A and the member profile 202D formed the member connection 204C "1 Year" ago. Thus, the member profile 202B is a more recent connection of member profile 202A than member profile 202D. The connection time data 306A-E may be a value stored in each a field of the data structure representing the member connection. For example, a member connection data structure may include, among other things, two fields containing the member profiles being connected and a time stamp field to indicate when the two members formed the member connection. Alternatively or additionally, the connection time data 306A-E may be a data structure separate from the data structure of the member connections 204A-E. For example, the recommendation engine 116 may maintain a data structure that maps an identifier assigned to a member connection to a value representing a connection time data.

It is to be appreciated that although FIG. 3 illustrates connection time data relative to a current time, other embodiments may utilize absolute time data (e.g., Sep. 15, 2013), while other embodiments may segment connection time data in time buckets (e.g., "Within the last day," Within the last week," "Within the last thirty days," and so forth).

Example Methods of Generating Member Profile Recommendations

Figure 4:
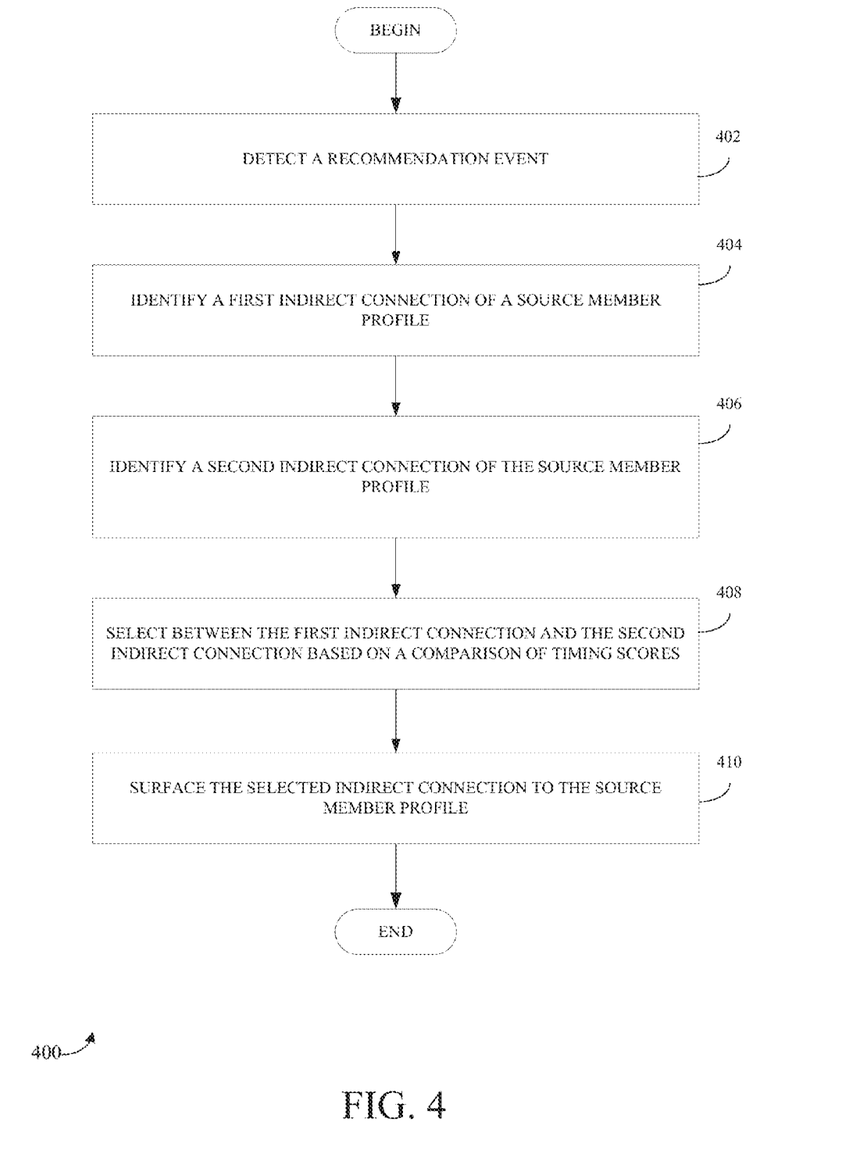
FIG. 4 is a flow diagram illustrating an example method for generating member profile recommendations based on connection time data derived from a social graph, consistent with some embodiments.

As described herein, the recommendation engine 116 may perform various methods when generating member profile recommendations based on connection time data derived from a social graph. FIG. 4 is a flow diagram illustrating an example method 400 for generating member profile recommendations based on connection time data derived from a social graph, consistent with some embodiments. The method 400 may be performed by the recommendation engine 116 and presentation engine 117 and, accordingly, is described herein merely by way of reference thereto. However, it will be appreciated that the method 400 may be performed on any suitable hardware. The method 400 may also be performed by operating on the social graph 200 shown in FIGS. 2 and 3 and, accordingly, is described herein merely by way of reference thereto. However, it will be appreciated that the method 400 may be performed on any suitable data structure.

At operation 402, the recommendation engine 116 may detect a recommendation event. A recommendation event may be an event that indicates that the recommendation engine 116 is to generate a member profile recommendation for a source member. In some cases, the recommendation engine 116 may detect the recommendation event through an explicit request through an application programmable interface (e.g., a function call or web-based service request) or based on detecting that the source member profile logged into or otherwise accessed the social network. The recommendation event may include data that specifies a source member profile (e.g., a member profile identifier that uniquely identifies a member profile from the other member profiles in the social network service) for the member profile recommendation.

At operation 404, responsive to detecting the recommendation event, the recommendation engine 116 may identify a first indirect connection of a source member profile. The first indirect connection may be a member profile connected to the source member through a first connection path that includes member connections between the source member profile, a first direct connection, and the first indirect connection. With temporary reference to FIG. 3, an example of a first connection path may be the minimum path from member profile 202A to member profile 202C. It is to be appreciated that this path includes member connections 204C and 204E. It is to be appreciated that each of these member connections may include connection timing data. For example, member connection 204C includes connection timing data 306C, and member connection 204E include connection timing data 306E.

With reference back to FIG. 4, the recommendation engine 116, at operation 406, may then identify a second indirect connection of the source member profile. The second indirect connection may be a member profile connected to the source member profile through a second connection path that includes member connections between the source member profile, a second direct connection, and the second indirect connection. With temporary reference again to FIG. 3, an example of a first connection path may be the minimum path from member profile 202A to member profile 202E. It is to be appreciated that this minimum path includes member connections 204B and 204A. It is to be appreciated that each of these member connections may include connection timing data. For example, member connection 204B includes connection timing data 306B, and member connection 204A include connection timing data 306A.

At operation 408, the recommendation engine 116 may then select between the first indirect connection and the second indirect connection based on a comparison of a timing score calculated for the first indirect connection and a timing score calculate for the second indirect connection. In some cases, operation 408 may use a timing function to perform the comparison. For example, the timing function may compare a timing score assigned to each of the indirect connections and then select the timing path with the preferred timing score.

The following is an example of a function used to assign a timing score to a connection path:

$$TS = w_1 * ctd_1 + w_2 * ctd_2$$

TS may represent a timing score. $w_1$ may represent a weighting factor to be applied to connection timing data ($ctd_1$) linked to a first member connection in a connection path between the source member profile and the indirect member profile. $w_2$ may represent a weighting factor to be applied to connection timing data ($ctd_2$) linked to a second member connection in the connection path between the source member profile and the indirect member profile. It is to be appreciated that the values of $w_1$ and $W_2$ may be values determined by a machine learning approach that adjusts the values for these weighting factors based on operating a set of training data such that the values predict the likelihood that a corresponding member may be of interest to a given member profile. It is to be appreciated that the above example of a function to calculate a timing score is provided for the purpose of illustration and not limitation, and example embodiments may use any other suitable timing function. For example, other embodiments may use the following function to calculate a timing score:

$$TS = w_1 * ctd_1 * w_2 * ctd_2.$$

In other example embodiments, the function to calculate a timing score (e.g., TS) may involve more or less time connection data. For example, where the recommendation engine 116 generates member profile recommendations for third-degree connections, the function to calculate TS may involve a third connection time data (e.g., $ctd_3$) and a third weighting factor (e.g., $w_3$). As another example, the function to calculate a timing score may be based on the connection time data of the first-degree member connection and not involve the connection time data of the indirect connections.

When a timing score is calculated for the first connection path and the second connection path, the recommendation engine 116 may select the second-degree connection associated with the connection path with the lowest timing score. For example, assuming $w_1$ and $w_2$ are both equal to the value '1.0,' although these weighting factors may be equal to any other suitable value. Under this example, the connection path to member profile 202C may result in a timing score of '7 days' (e.g., 1*'5 Days'+1*'2 Days'='7 days'), while the connection path to member profile 202E may result in a timing score of '1 year and 5 days' (e.g., 1*'1 Year'+1*'5 Days'='1 Year and 5 days'). Thus, the recommendation engine 116 may select the member profile 202C because the member profile 202C is included in a connection path with a lower timing score than the connection path that includes member profile 202E.

With continued reference to FIG. 4, the presentation engine 117, at operation 410, may then surface the selected indirect connection to the source member profile as, for example, a member profile recommendation. A connection recommendation may be a recommendation configured to cause a client device operated by the source member to display information from the member profile of the selected indirect connection (e.g., name, title, profile image, and the like). The connection recommendation may also be configured to cause the client device to display an interface element that, if activated by the source member, causes the social network service to form a direct connection between the source member and the selected indirect connection. A connection recommendation is discussed in greater detail below with reference to FIG. 6.

It is to be appreciated that some operations of FIG. 4 may be performed prior to detecting a recommendation event.

Figure 5:
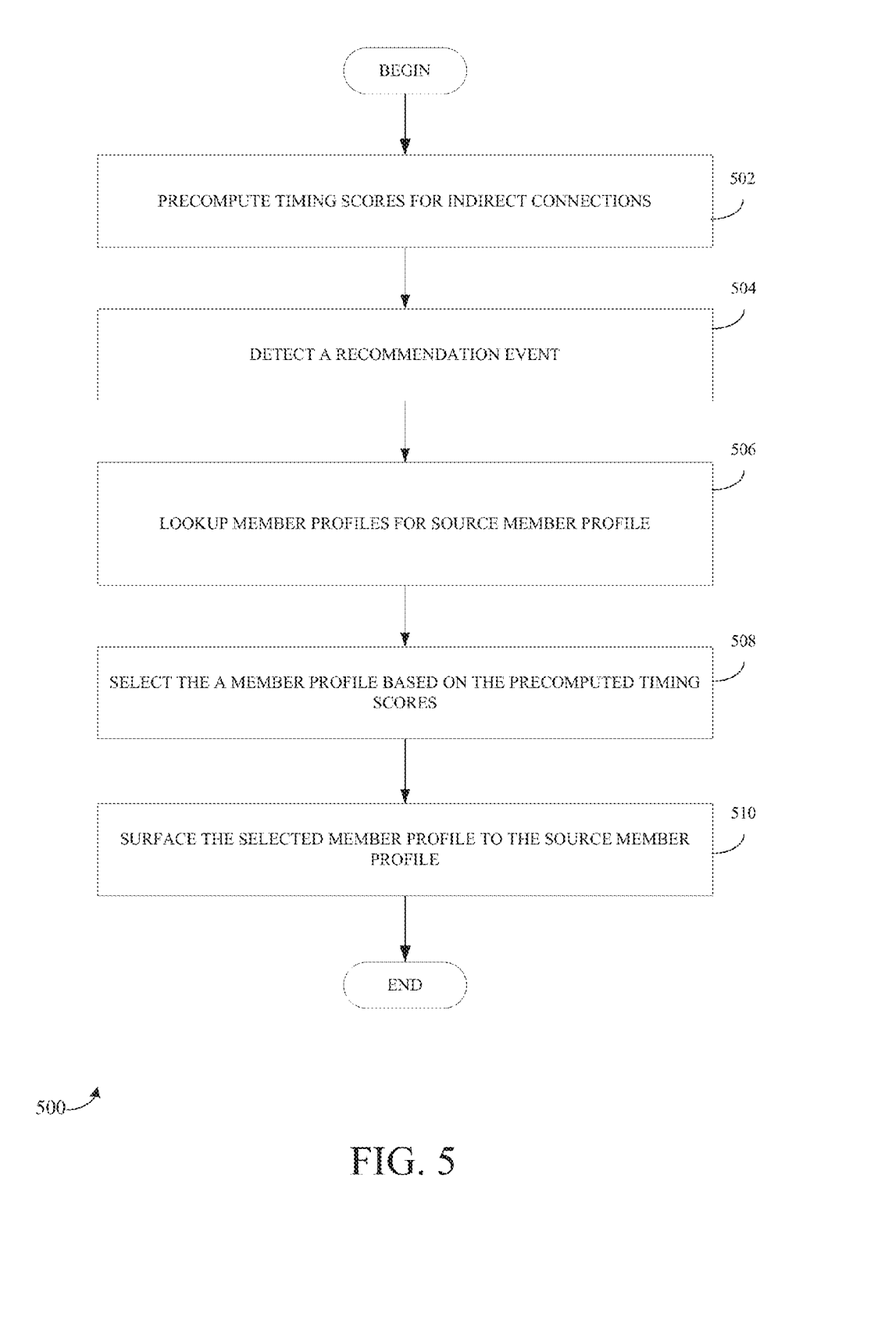
FIG. 5 is a flow diagram illustrating a method that pre-computes timing scores for indirect connections of a source member, according to an example embodiment.

FIG. 5 is a flow diagram illustrating a method 500 that pre-computes timing scores for indirect connections of a source member, according to an example embodiment. The method 500 may begin at operation 502 when the recommendation engine 116 calculates a timing score for one or more indirect connections associated with a source member profile. Calculating a timing score is described with reference to operation 408 of FIG. 4. Operation 402 may be part of a scheduled background process that operates independently of whether a service requests a member profile connection.

The calculated timing scores and corresponding indirect connections may be stored as a list (or any other suitable data structure) of tuples, where each tuple pairs a calculated timing score with a corresponding member profile. These tuples may then be stored in a lookup table indexed by the member profile identifier assigned to the source member. For example, the recommendation module 116 may store the following tuples using an index associated with the member profile identifier assigned to the source member profile: <'7 Days', Member Profile 202C>, <'1 Year and 5 Days', Member Profile 202E>.

At operation 504, the recommendation engine 116 may detect a recommendation event. As described with reference to operation 402 of FIG. 4, a recommendation event may be an event that indicates that the recommendation engine 116 is to generate a member profile recommendation for a source member. In some cases, the recommendation engine 116 may detect the recommendation event through an explicit request through an application programmable interface (e.g., a function call or web-based service request) or based on detecting that the source member profile logged into or otherwise accessed the social network. The recommendation event may include data that specifies a source member profile (e.g., a member profile identifier that uniquely identifies a member profile from the other member profiles in the social network service) for the member profile recommendation.

At operation 506, responsive to detecting the recommendation event, the recommendation engine 116 may search the indirect member connections and corresponding timing scores for the source member. This lookup may be performed by requesting the pre-computed timing scores in the lookup table described above with reference to operation 502. Thus, retrieving the pre-computed timing scores based on the identifier assigned to the source member profile may return <'7 Days', Member Profile 202C>, <'1 Year and 5 Days', Member Profile 202E>.

At operation 508, the recommendation engine 116 may then select the indirect connection based on a ranking of the timing scores calculated for each indirect connection. Thus, member profile 202B may be selected because that member profile corresponds with the lowest timing score (most recent).

At operation 510, the selected indirect member profile is then surfaced to the source member profile. Surfacing an indirect member profile is described in greater detail with reference to operation 410 of FIG. 4.

Example User Interfaces

As described herein, the presentation engine 117 may surface content from member profiles selected by the recommendation engine 116. In the case of connection recommendations, the content from the member profile may be presented in conjunction with actionable display elements that may, in some cases, cause the social network service to create a direct member connection between the source member profile and a member profile surfaced by the presentation engine 117.

Figure 6:
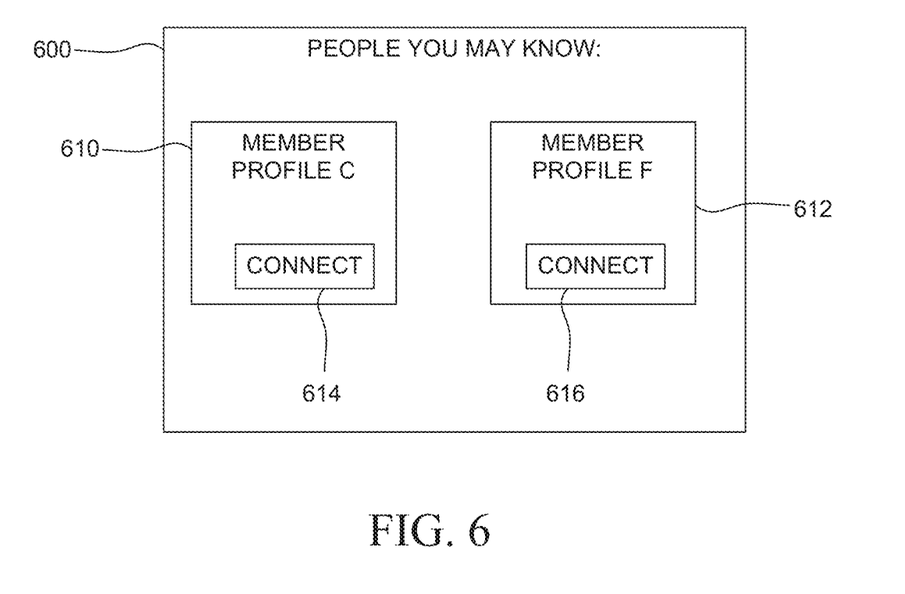
FIG. 6 is a user interface diagram illustrating a user interface for surfacing member profile recommendations to a source member of a social network service, consistent with some embodiments

FIG. 6 is a user interface diagram illustrating a user interface for surfacing member profile recommendations to a source member of a social network service, consistent with some embodiments. FIG. 6 depicts a suggestion module 600 that surfaces (e.g., displays) content derived from member profiles of the social network service that suggest member connections 610-612 to a source member. The connection recommendations 610-612 may be data or logic that may represent content derived from member profiles selected by the recommendation engine 116. For clarity of description, not limitation, connection recommendation 610 may include content derived from member profile 202C of FIGS. 2 and 3, and connection recommendation 612 may include content derived from member profile 202F of FIGS. 2 and 3. In some cases, the recommendation engine 116 may determine that the member profile represented by the member connections 610 and 612 (e.g., member profile 202C and member profile 202F, respectively) are likely to be of interest to the source member (e.g., member profile 202A) because the member profiles represented by the member connections 610 and 612 are connections of a recent connection (e.g., member profile 202B).

FIG. 6 shows that the connection recommendations 610 and 612 each include connection activators 614 and 616, respectively. A connection activator may be an actionable user interface element that causes, when activated by the source member, the social network service to send an invitation to the member profile corresponding to the connection recommendation. For example, responsive to the source member activating the connection activator 614, the social network service 100 may then send an invitation to the member profile 202C to form a member connection with the source member profile (e.g., member profile 202A).

The presentation engine 117 may surface the suggestion module 600 within a user interface the source member uses to access the social network service. For example, the presentation engine 117 may surface the suggestion module 600 within a sidebar or rail location within a member profile page associated with the source member profile.

It is to be appreciated that the suggestion module 600 shown in FIG. 6 is provided to illustrate an example embodiment and should not be interpreted as limiting any aspect of other example embodiments contemplated by this disclosure. For example, other embodiments may display more or less connection recommendations (e.g., three connection recommendations). Further, according to some embodiments, the member profiles represented by the connection recommendations may differ, depending on the implementation of the recommendation engine 116 discussed above. For example, some embodiments may utilize a timing function that weights the importance of the recent timing of a direct connection less than other embodiments.

Alternative Embodiments

It is to be appreciated that although the example methods and systems described herein have been described with respect to generating member profile recommendations usable to suggest member profiles another member profile may know (but is yet a direct connection), it is to be appreciated that the recommendation engine 116 may be used to provide member profile recommendations usable in other types of applications. For example, the recommendation engine 116 may interface with an endorsement application. The endorsement application may be an application configured to suggest member profiles that a member may be interested in endorsing (e.g., such as a skill) Thus, in an example embodiment, the member connections 204A-E may represent endorsements of a skill between members. Thus, the endorsement application may use the member profile recommendation to generate a recommendation of member profile recently recommended by a member profile the source member recommended. The connection application may be an application configured to generate a recommendation for a source member Example Computer Systems The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Figure 7:
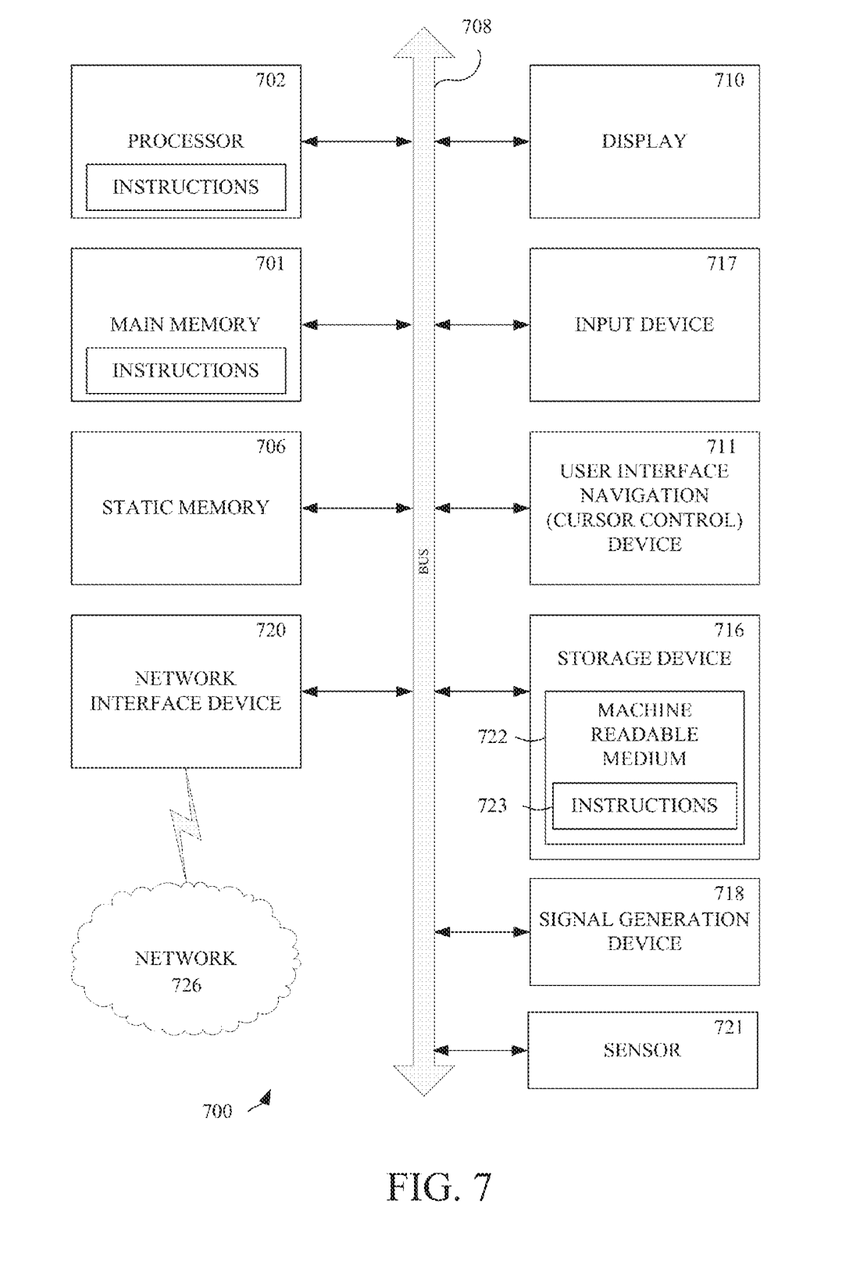
FIG. 7 is a block diagram of a machine in the form of a computing device within which a set of instructions, for causing the machine to perform any one or more of the methodologies discussed herein, may be executed.

FIG. 7 is a block diagram of a machine in the form of a computer system or computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In some embodiments, the machine will be a desktop computer, or server computer, however, in alternative embodiments, the machine may be a tablet computer, a mobile phone, a personal digital assistant, a personal audio or video player, a global positioning device, a set-top box, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a display unit 710, an alphanumeric input device 712 (e.g., a keyboard), and a user interface (UI) navigation device 714 (e.g., a mouse). In one embodiment, the display, input device and cursor control device are a touch screen display. The computer system 700 may additionally include a storage device 716 (e.g., drive unit), a signal generation device 718 (e.g., a speaker), a network interface device 720, and one or more sensors, such as a global positioning system sensor, compass, accelerometer, or other sensor.

The drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 724 may further be transmitted or received over a communications network 726 using a transmission medium via the network interface device 720 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although some embodiments has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
identifying a first indirect connection of a source member profile, the first indirect connection being a member profile connected to the source member profile through a first connection path that includes member connections between the source member profile, a first direct connection, and the first indirect connection;
identifying a second indirect connection of the source member profile, the second indirect connection being a member profile connected to the source member profile through a second connection path that includes member connections between the source member profile, a second direct connection, and the second indirect connection;
selecting, by one or more processors, between the first indirect connection and the second indirect connection based on a comparison of a timing score calculated for the first indirect connection and a timing score calculated for the second indirect connection; and
surfacing the selected indirect connection to a client device associated with the source member profile.

2. The computer-implemented method of claim 1, further comprising calculating the timing score associated with the first indirect connection based on a function of connection timing data associated with one or more of the member connections of the first connection path.

3. The computer-implemented method of claim 1, further comprising calculating the timing score associated with the second indirect connection based on a function of connection timing data associated with one or more of the member connections of the second connection path.

4. The computer-implemented method of claim 1, wherein the operation of identifying the first indirect connection of the source member profile and the operation of identify the second direct connection are performed in response to detecting a recommendation event.

5. The computer-implemented method of claim 4, wherein the recommendation event being a service request sent by a service generating connection recommendations for the source member profile.

6. The computer-implemented method of claim 4, wherein the timing score associated with the first indirect connection and the timing score associated with the second indirect connection are both calculated prior to receiving the recommendation event.

7. The computer-implemented method of claim 1, wherein the operation of identifying the first indirect connection of the source member profile is performed by using a member profile identifier assigned to the source member profile to search a name value data source that returns a list of member profile identifier and timing score pairs, the list include a member profile identifier and timing score pairs including a pair including a member profile identifier assigned to the first indirect connection and the timing score associated with the first indirect connection.

8. The computer-implemented method of claim 1, further comprising calculating the timing score associated with the first indirect connection based on connection timing data of a member connection between the source member profile and the first direct member connection.

9. The computer-implemented method of claim 1, wherein calculating the timing score associated with the first indirect connection is based further on connection timing data of a member connection between the first direct member connection and the first indirect member connection.

10. The computer-implemented method of claim 1, wherein the operation of surfacing the selected indirect connection to the client device associated with the source member profile includes communicating data relating to a user interface element capable of sending a request to invite the first indirect connection to form a member connection with the source member profile.

11. A computer system comprising:
at least one processor;
a recommendation engine implemented by the at least one processor and configured to:
identify a first indirect connection of a source member profile, the first indirect connection being a member profile connected to the source member profile through a first connection path that includes member connections between the source member profile, a first direct connection, and the first indirect connection;
identify a second indirect connection of the source member profile, the second indirect connection being a member profile connected to the source member profile through a second connection path that includes member connections between the source member profile, a second direct connection, and the second indirect connection;
select, by one or more processors, between the first indirect connection and the second indirect connection based on a comparison of a timing score calculated for the first indirect connection and a timing score calculated for the second indirect connection; and
a presentation engine implemented by the at least one processor and configured to surface the selected indirect connection to a client device associated with the source member profile.

12. The computer system of claim 11, further comprising calculating the timing score associated with the first indirect connection based on a function of connection timing data associated with one or more of the member connections of the first connection path.

13. The computer system of claim 11, further comprising calculating the timing score associated with the second indirect connection based on a function of connection timing data associated with one or more of the member connections of the second connection path.

14. The computer system of claim 11, wherein the operation of identifying the first indirect connection of the source member profile and the operation of identify the second direct connection are performed in response to detecting a recommendation event.

15. The computer system of claim 14, wherein the recommendation event being a service request sent by a service generating connection recommendations for the source member profile.

16. The computer system of claim 14, wherein the timing score associated with the first indirect connection and the timing score associated with the second indirect connection are both calculated prior to receiving the recommendation event.

17. The computer system of claim 11, wherein the operation of identifying the first indirect connection of the source member profile is performed by using a member profile identifier assigned to the source member profile to search a name value data source that returns a list of member profile identifier and timing score pairs, the list include a member profile identifier and timing score pairs including a pair including a member profile identifier assigned to the first indirect connection and the timing score associated with the first indirect connection.

18. The computer system of claim 11, further comprising calculating the timing score associated with the first indirect connection based on connection timing data of a member connection between the source member profile and the first direct member connection.

19. The computer system of claim 11, wherein calculating the timing score associated with the first indirect connection is based further on connection timing data of a member connection between the first direct member connection and the first indirect member connection.

20. A non-transitory computer-readable medium storing executable instructions thereon, which, when executed by a processor, cause the processor to perform operations comprising:
identifying a first indirect connection of a source member profile, the first indirect connection being a member profile connected to the source member profile through a first connection path that includes member connections between the source member profile, a first direct connection, and the first indirect connection;
identifying a second indirect connection of the source member profile, the second indirect connection being a member profile connected to the source member profile through a second connection path that includes member connections between the source member profile, a second direct connection, and the second indirect connection;
selecting, by one or more processors, between the first indirect connection and the second indirect connection based on a comparison of a timing score calculated for the first indirect connection and a timing score calculated for the second indirect connection; and
surfacing the selected indirect connection to a client device associated with the source member profile.

* * * * *